United States Patent [19]

Shimoni et al.

[11] Patent Number: 4,654,877
[45] Date of Patent: Mar. 31, 1987

[54] DATA COMPRESSION SYSTEM

[75] Inventors: Yair Shimoni, Jerusalem; Paul Fenster, Petach Tikva, both of Israel

[73] Assignee: Elscint Ltd., Haifa, Israel

[21] Appl. No.: 645,110

[22] Filed: Aug. 28, 1984

[51] Int. Cl.[4] .............................................. G06K 9/00
[52] U.S. Cl. ...................................................... 382/56
[58] Field of Search ............... 382/56, 41, 6; 358/261, 358/260

[56] References Cited

U.S. PATENT DOCUMENTS

4,041,456  8/1977  Ott et al. ................................ 382/30
4,369,463  1/1983  Anastassiou et al. ................. 382/56
4,563,671  1/1986  Lim et al. .............................. 382/56

Primary Examiner—Stephen A. Kreitman
Attorney, Agent, or Firm—Sandler & Greenblum

[57] ABSTRACT

A data compression system for use in processing diagnostic image data which combines delta modulation with coding the most prevelant difference by a code other than a least bit code but coding the most prevalent number of strings with a least bit code and also coding the next most common differences with a least bit code and subsequent most common differences with sequentrial least bit codes to provide compression ratios of over 3:1.

52 Claims, 4 Drawing Figures

DATA COMPRESSION SYSTEM

FIELD OF THE INVENTION

This invention is concerned mainly with imaging systems, wherein large amounts of data are acquired and processed to provide the final image and more particularly with the systems and methods used for storing the image data with substantially no loss of accuracy.

BACKGROUND OF THE INVENTION

The advent of modern computer systems spurred the development of imaging systems. Imaging systems are used in such diverse fields as military intelligence photography, astronomy, geology, agriculture and medical diagnostic imaging. This invention while finding utility in other and related imaging systems was particularly developed for that branch of diagnostic imaging generally known as digital fluorography. Although the following discussion of the background and the following description of the invention deal mainly with medical diagnostic imaging systems, the same problems occur in other systems with large amounts of data and therefore the invention is applicable to such systems, whether the data is arranged one-dimensionally, two-dimensionally or multi-dimensionally.

As computers progressed in speed and capacity, so did the amounts of data used per image. Most images are arranged in rectangular (or even square) matrices and their size can be specified by their matrix dimensions. In medical imaging, for example, image size has grown from 32×32, ten years ago, to 512×512 or even 1024×1024 today. This thousandfold increase in data amounts is faster than the rate of decrease in the price of memories of all types, and data amounts keep growing. These amounts of data raise a number of problems.

In digital fluorography as in other branches of diagnostic imaging the data storage space and the time for transferring data to and from the temporary stores of the computer itself are critical factors in the imaging system's efficient operation.

For example the amount of data that can be stored in the Random Access Memories (RAMs) of the computer systems used is extremely limited. The RAMs are expensive and therefore increasing the data capacity by increasing the capacity of RAMs is an expensive proposition. In addition with the RAMs there is the ever present danger of losing data, since the RAMs require power to maintain the data. This characteristic makes the RAMs expensive to operate since they are drains on the power system.

Therefore imaging systems generally store the data on memory systems such as magnetic tapes or disks as soon as possible. Such memories hold more data than the RAM type memories and the retention does not require power. Among the drawbacks of such memories are that it takes longer periods of time to on-load and off-load disks or tapes than to transfer data to and from RAMs. Also while the storage space in disks and tapes is much greater than that of RAMs, nonetheless it is limited.

Low resolution imaging systems are systems with low resolution requirements that can store data analogically. Such systems can usually store data directly as it is acquired. Slow imaging systems are systems with low speed requirements; that is they acquire data at a low rate. Such systems can usually store data directly as it is acquired, even digitally and thus do not need large internal RAMs. Fast, high resolution imaging systems either use very fast and very expensive disks or first acquire the data and store it in the RAMs from where the data are transferred to the external memory, for example, for long term storage. The long time period required for on loading the disks makes it necessary to either use buffer memory devices such as disclosed in the patent application entitled "Buffer Memory Systems" filed in the United States on Apr. 21, 1983, bearing Ser. No. 487,312 and assigned to the assignee of this invention; or, the use of more RAMs which as noted is expensive. Alternatively, continuing the data acquisition processes without storing all of the data results in exposing the patient to unnecessary radiation.

To increase the always limited storage capacity and to speed the transfer of data to the permanent storage systems, data compression systems have been used. Compression as used herein means transforming the data to reduce the size of the storage needed for the amount of data to be placed, either in the temporary, in the short term or in the long term storage. Storage size is measured by the total number of bits (binary digits) necessary to store the data in its current representation. The efficiency of a compression depends on the ratio of the necessary storage size before compression to the necessary storage after compression (compression ratio). For an example of systems for reducing the necessary storage size see the patent application entitled "Super Interlacing System" filed in the United States on Nov. 14, 1983, bearing Ser. No. 551,698 and assigned to the assignee of this invention.

Other compression methods used in imaging systems in the past include circle cutting, delta modulation and Huffman codes, string length coding, etc.

A short description follows of two prior art compression methods, to aid in obtaining a better understanding of this invention:

a. String length coding replaces strings of identical values by the value followed with the length of the string (or the length and then the value). This is effective if the length needed to write the coded value is shorter than the length of the average string. For example, if information is usually coded in 4-bit units and the number zero appears in strings the maximum length of which is 20,000; then 15 bits are needed to make sure that the number 20,000 can be written. Where units of 4 bits are to be retained, then 4 units have to be reserved in the code for storing the string length. The total code is therefore 5 units of 4 bits. The code is efficient if the average string length is greater than 5. Every number can be thus coded, or only given ones, that are expected to come in long strings.

b. "Replacement" coding (of which "Tree" codes and specifically the Huffman code are examples) replaces every number with a code value.

In general, the more common a value is in the image, the shorter is its coded value. The commonest values have coded values shorter than the uncoded size, while the least common values have perforce, coded values longer than the uncoded size.

The code is built using the statistics, i.e., the distribution of the data values, in such a way that the storage size needed for the code of the total image is less than the original storage size. This code is effective if built separately for each image, according to its specific statistics but loses effectiveness rapidly if the statistics change, e.g., if used for a different image with different statistics. A replacement code that is universally effective is virtually impossible, and a standard code that is used for a given range of statistics is usually not very efficient. We shall use the term "efficient replacement code" to denote a replacement code that uses the statistics to obtain a compression ratio that is optimal or close to optimal, as described above. We shall use the term "quasi efficient replacement code" to denote a replacement code replacing the commonest value by a code value other than the shortest, i.e., by a code value longer than would be applied using an efficient replacement code, but otherwise following the general rule above.

Certain operations or mechanisms can be used to enhance the efficiency of compression. Consider, for example, the "difference" method, or the "delta" modulation compression method (the different names apply to essentially the same method and arise from the different fields where the method was applied, in digital and analog signal processing). There, instead of looking at the values, one looks at the differences between the values in adjacent elements (pixels, if performed on an image). As the objects being imaged rarely change much within the resolution of the imaging equipment, these differences between the pixels are usually much smaller than the pixel values themselves. In many cases, such as in computerized-tomography (CT) images units of fewer bits may be used to store the differences than are needed for storing the original values (e.g. 8 instead of 12). However, noise reduces the efficiency of the method.

A variation of the difference method deals specificly with regions where there is no data. These regions may still contain noise. The knowledge that there is no data may be utilized to advantage. For example, these no-data regions may be ignored; alternatively, they may be filled with a constant value to replace the noise, thus making all differences between neighboring elements equal zero.

A problem that has to be carefully treated when using data compression systems is the loss of accuracy that often occurs when operating on the data to compress it for storage and expand it for use.

Some compression methods take into account the fact that the data is accurate only to some limit by intentionally discarding information within the proscribed limit of accuracy. Any changes under that limit of accuracy are due mostly to noise and if real, are masked by, or buried in the noise. The term "noise" here refers to random changes due to many causes, instigating inaccuracies in data values if taken separately. For example, count data, used in nuclear medicine, is accurate only to its own square root. That is, if the value measured in n, the "true" value has a probability P(m) to be m that is Gaussian, centered around n and spread with standard deviation equaling the square root of n; so that:

$$P(m) = \exp(-(m - n)^2/2n)/\sqrt{2\pi n}$$

Alternately, if n is the "true" value, P(m) is the probability of sampling (or measuring) the value m instead of n. If the count is 100 then the standard deviation is 10, therefore there is little information lost if the value 100 is stored as, say 99 or 101.

Some compression aids and enhancement methods, such as the "difference" method described above, are susceptible to noise, which reduces the efficiency of the method. However, any reduction of the aforementioned noise to increase the method's efficiency incurs some information loss. Actually, compression methods allowing "information loss" may be very efficient, provided they sufficiently reduce the noise.

In the above nuclear medicine example, if the expected range of values is from 0 to 255 then 8-bit units are needed to store the data. The noise has a standard deviation in the range of 0–16 and there is 95% probability of the noise in a particular element being within 3 standard deviations. The average standard deviation of the noise in the image is the square root of the average value, or about a factor of the square root of two smaller than 16. Applying the difference method to the image implies doing subtractions. The subtraction operation increases the standard deviation by the same factor of the square root of two, making the average standard deviation of the noise in the differences equal 16. Therefore, 95% of the differences would be in the range −48 to +48, even when there is no change in the object imaged. This range is already the same as 0–96 and requires 7-bit units, which is no great gain over the original 8-bit unit storage. Smoothing this image, while theoretically causing some loss of information, does not adversely affect the image as to reliability of information (it may even improve detectability). At the same time, by reducing the standard deviation of the noise by a factor of, say 3, it brings the changes to a range that may be stored in 5-bit units, thus improving compression efficiency.

However, while information loss may be acceptable in many imaging fields, in the medical diagnostic imaging field the physicians object to any information loss. Also, in some diagnostic imaging modalities such as in digital fluoroscopy noise levels are so low that not much is gained by "information loss", unless of a specific nature, having other advantages.

The prior art compression systems used in the past do not provide compression rates in the range of 3 to 1 without a serious loss of accuracy when applied to, say, digital fluorographic images with 512×512 matrices. There are several uses for which such compression rates with digital fluorographic images having 512×512 matrices.

Accordingly there is a serious and pressing need for efficient data compression methods and systems for use in imaging systems.

BRIEF DESCRIPTION ON THE INVENTION

According to a broad aspect of the present invention, data compression methods and systems are provided for use in compressing data to make more efficient use of memory space and to expedite the storage of such data; the data compression method comprising the steps of:
acquiring non-compressed data,
compressing the data with a first replacement code arrangement, said first replacement code comprising a quasi efficient replacement code,
compressing the data with an additional code arrangement that can be selectively applied to specific values, such as "string length" coding, and
compressing the data by compressing the results of the above additional code with a second replacement code arrangement.

A feature of the present invention comprises delta modulating the non-compressed data to obtain difference values and compressing the new data set made of the difference values.

A related feature of the invention comprises compressing differences between the data and a reference, or mask, image.

A related feature of the invention comprises choosing as the above mask a temporally separated image of the same subject or object.

A similar feature of the invention comprises choosing as the above mask an image of the same subject or object, which has been processed so as to reduced noise.

Another related feature of the invention comprises using differences between picture elements along either of the two orthogonal axes of the image.

Yet another related feature of the invention comprises using multiple differences between picture elements along a plurality of orthogonal axes of the image, including the time axis.

Yet another feature of the present invention comprises suppressing noise in no-data regions, where necessary.

A further feature of the invention comprises using look up tables for implementing said first and second replacement codes.

A related feature of the invention comprises employing as the above first replacement code a code built according to the distribution of values in the non-compressed data.

A related feature of the invention comprises employing as the above first replacement code a code built according to the assumed distribution of values in the non-compressed data.

Another feature of the present invention comprises employing said string-length coding for a given value only.

Yet another feature of the invention is selecting as the said given value the value known to be the most common value in the data.

Yet another feature of the invention is selecting as the said given value the value assumed to be the most common value in the data.

An alternative feature of the invention is selecting as the said given value the value known to be the most common difference value if the data to be compressed is the said new data set made of differences.

Still another related feature of the invention provides the value selected as the most common value in the said data to be compressed (original or difference) with a basic code that is longer than indicated by an "efficient" replacement code. Depending on the data, sometimes the shortest code is assigned to both the second and the third most common values. This applies, for example, where the second and third most common values are substantially of the same absolute value, such as for difference values which are inherently substantially symmetric with regards to zero.

This arrangement surprisingly provides the most efficient data compression without loss of information in imaging systems such as those used in digital fluorography.

In general it is a feature of the invention to select the replacement codes for the most common values (the "basic" code) and the replacement codes for the second most common values ("second code") so that the basic code is "effectively" the shortest code even though the basic code may actually be longer than the second code. The basic code is "effectively" the shortest code when the average coded number of bits (binary digits) representing each most common difference value is minimal and smaller than the average coded number of bits representing each second most common difference value. This is made possible only by the using the replaced string length code for the commonest value in the data, which coding further compresses that part of the data made of the commonest value.

BRIEF DESCRIPTION OF THE DRAWINGS

The above mentioned and other features and objects of the invention will be best understood in the context of the following description of the invention made in conjunction with the accompanying drawings; in which.

GENERAL DESCRIPTION

Figure 1:
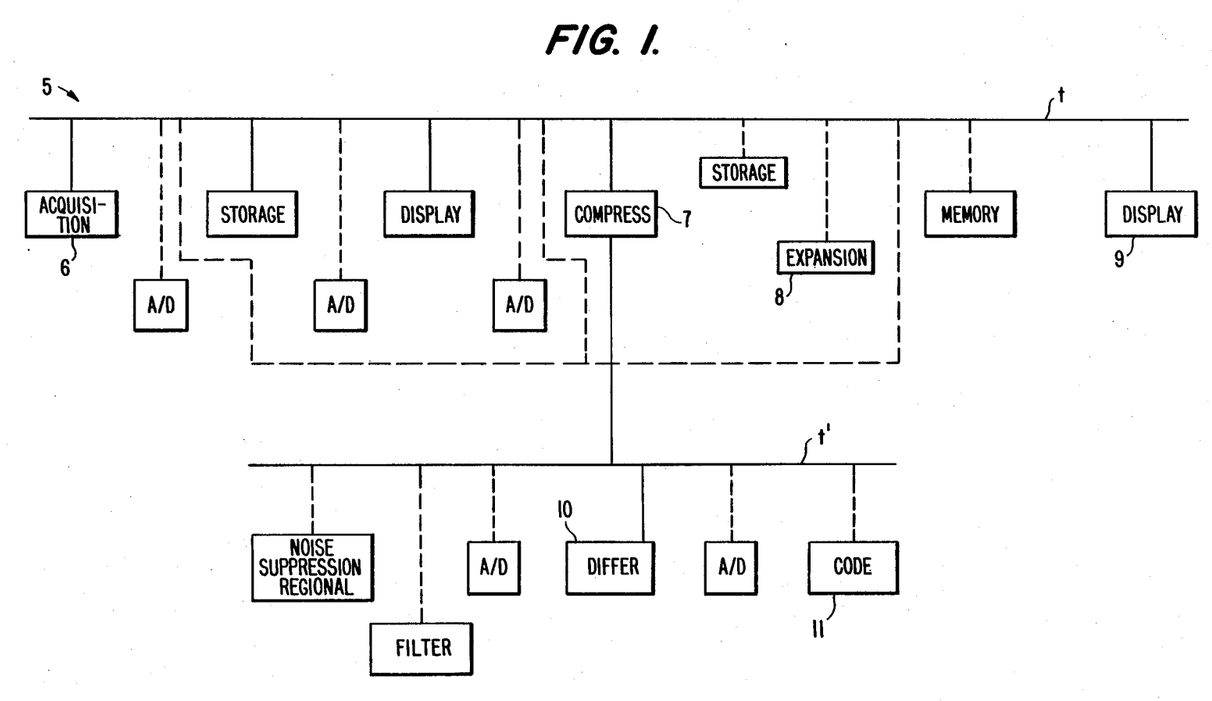
FIG. 1 is a time axis block diagram showing of a generalized inventive data compression/expansion system.

The time axis showing of FIG. 1 includes items or operations that are deemed to be required at particular times, shown as being connected to the solid horizontal time lines t and t' by solid vertical lines, and items or operations that are optional at particular times, shown connected to the time lines t,t by dashed vertical lines. The data compression system 5 of the invention as shown in FIG. 1 thus includes acquisition means 6 for the acquisition of data; compression means 7 for the compression of the data; expansion means 8 for the expansion of the data and some type of display equipment 9 to display the data.

The compression means in a preferred embodiment includes means for obtaining differences (delta modulation) 10 and for coding the differences 11. In the example of imaging, the type of imaging system will dictate if, when and where peripheral operations such as noise suppression, filtering, analog to digital conversion, memory storage and data processing are performed. Note that while ideally noise suppression is shown as an option, the vast majority if not all of presently available systems would be improved by noise suppression. FIG. 1 emphasizes the broad coverage of the invention.

Figure 2:
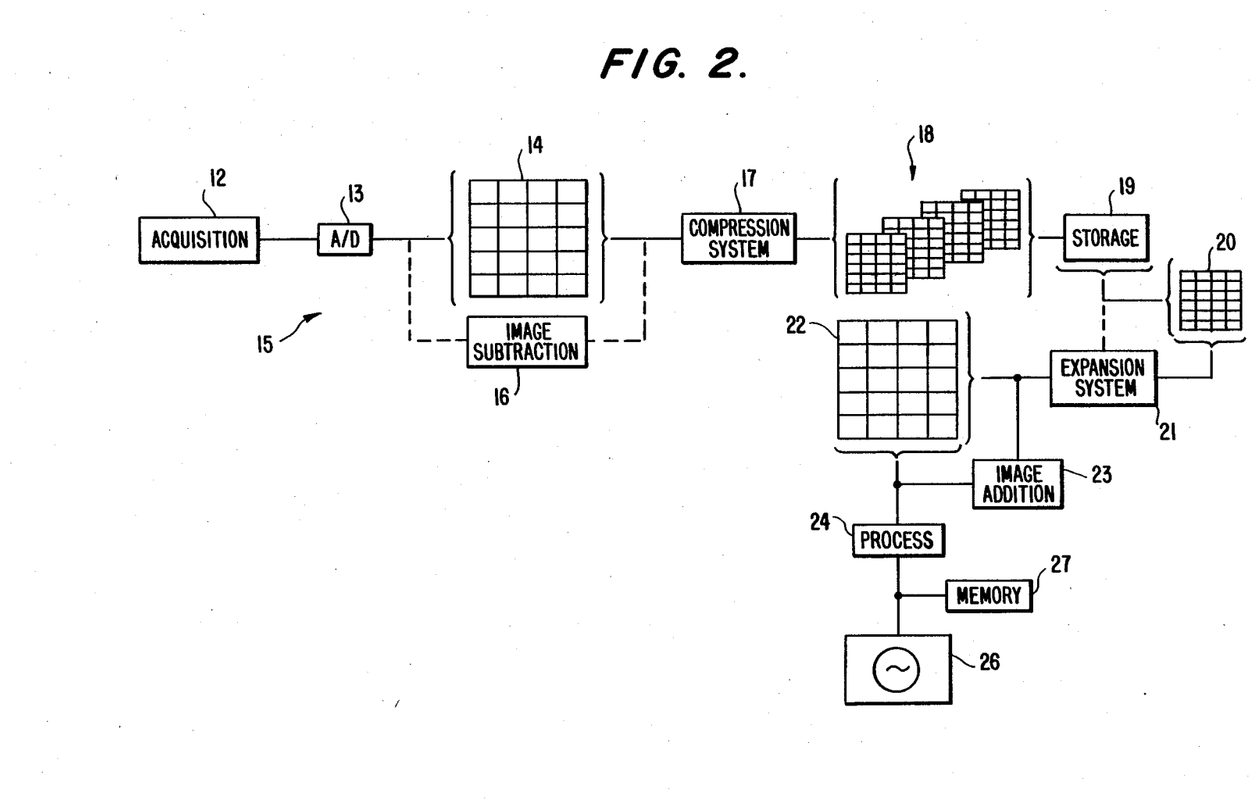
FIG. 2 is a block diagram showing of a particularized inventive data compression/expansion system.

The particularized imaging system 15 of FIG. 2 includes the necessary acquisition means 12 for acquiring image data. The acquisition means typically acquires analog data which is shown as being converted to digital data by analog-to-digital (A/D) converter 13. The digital output of the A/D unit is either operated on directly for image enhancement purposes or stored in the available short term storage facilities such as in the RAM associated with the computer (not shown). The data is typically stored in matrices of elements of data arranged in rows and columns, such as depicted by matrix 14. The data can be written into the matrices at a relatively fast rate. However as mentioned hereinbefore, the RAM memories are relatively expensive and limited.

Certain operations are preferably carried out prior to the compression—especially operations which themselves reduce the quantity of data. For example, the image subtraction operation of digital fluorography is preferably accomplished prior to the data compression as shown in FIG. 2 where the image subtraction means 16 is shown coupled either prior to or after storage in data matrix 14 and prior to data comression system 17. It should be realized however that the data subtraction system is not necessary to the invention.

Another possible operation is noise reduction in areas with no data. For example, TV cameras, gamma cameras, tomography recontsructors etc; produce round images; any part of the (square) matrix outside this circle has no useful data and the values therein can be disregarded or replaced by a constant value which is selected to increase the compression ratio. Other areas known to have no data content can be similarly treated.

The compression system 17 uniquely compresses the data stored in matrix 14 in an optimal manner so that the total quantity of data per image is minimized without causing any ambiguities in the expansion procedures that are implemented prior to operating on the data. Thus in digital fluorographic systems having images with $512 \times 512$ matrices compression ratios in the order of 3 to 1 are obtained using this invention without any loss of accuracy.

Once again it is emphasized, as shown in FIG. 1, that within the scope of the invention compression can occur at any point in the data processing, for example before storage, after storage, in parallel to storage or without storage. As shown in the compression expansion system 15 of FIG. 2 the compressed data from compression unit 17 may be temporarily stored in smaller matrices, such as matrix 18, which represents the compressed data for an image. The compressed data in any event is shown as being written into the long term external storage means such as storage 19 representing disk or magnetic tape means.

Since the compressed data has approximately one-third as many digits as the uncompressed data it takes approximately one-third of the time to write the compressed data onto the external storage means 19. It should also be apparent that approximately only a third of the storage space is required for the compressed data. Of at least equal importance is the fact that since the data can be fed into the permanent storage in less time, the RAM can be read-out in a shorter time.

Therefore a smaller RAM memory is required for temporary or buffer storage in the inventive system for the same amount of data. Alternatively—longer runs of data can be acquired before filling the same buffer.

When processing of the data is required either for evaluation purposes, for enhancement purposes or for display purposes, then it is necessary to expand the compressed data. The expansion is substantially accomplished by expansion system 21 which obtains the compressed data from storage 19. The output of the expansion system 21 is the uncompressed data which may be arranged in rows and columns of data elements such as shown in matrix 22. The expansion system expands the data by the inverse of the compression ratio to return the data in matrix 22 to its original form, i.e. that of matrix 14.

For cases wherein image enhancement was accomplished by subtraction, such as by image subtraction unit 16, an image addition unit 23 is attached either prior to or after matrix 22 so that the processor 24 may be provided with the original unsubtracted image data. The image addition unit 23 like the image subtraction unit are not key elements of the invention but are optional as far as this invention is concerned.

The processor 24 shown in FIG. 2 is a display processor whose output is either the display image shown on display unit 26 or an image stored in memory unit 27.

Figure 3:
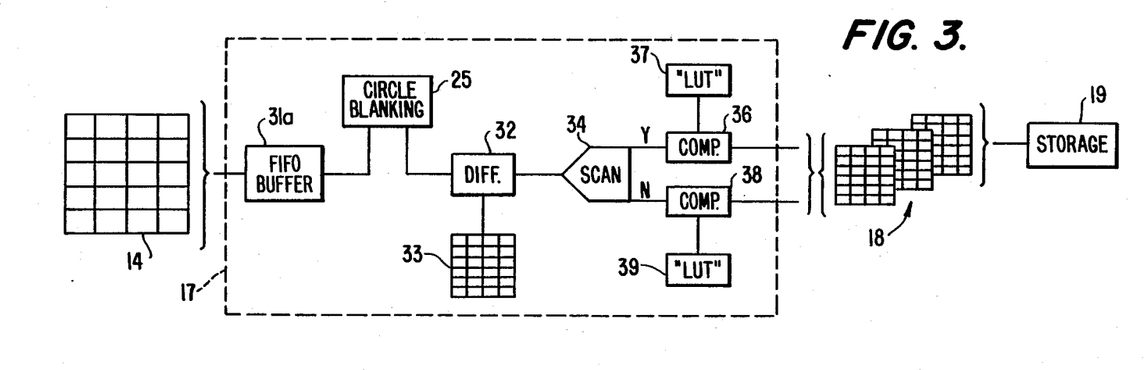
FIGS. 3 and 4 are block diagram showing details of the data compression and expansion systems of FIG. 2.

The details of the compression unit as shown in FIG. 3 are much narrower than the invention. Among other things, the step of obtaining the difference between adjacent data elements can be accomplished in many different ways even for the particularized system of FIG. 2. For example:

(a) delta modulation can be done on the analog signal prior to a log transformation step (not shown);

(b) delta modulation can be accomplished after log tranformation, on either analog or digitized data.

(c) differences of the incoming signals can be done "on-the-fly" with either no intermediate storage or in parallel to storage;

(d) differences of the incoming signals can be done "on-the-fly" prior to storage (here, the difference data is stored);

(e) differences of stored data in an intermediate memory can be obtained, simultaneously with the acquisition of more data into different parts of the memory; and (f) difference of the stored data can be obtained after acquisition has been completed.

The data compressor 17, as shown in FIG. 3, includes a buffer unit 31a. The buffer unit, preferably a "First In, First Out" (FIFO) type buffer is required to compensate for the relatively large differences in the time needed to code and handle data of different values or types such as strings, long code values, short code values, etc. At the same time as data flows in at a steady rate the buffer 31a transmits the data on a first-in first-out basis with calculated delays to maintain a steady flow of compressed data to storage unit 19. The first of the FIFO buffers 31a may be omitted if in all cases the compression means is fast enough to respond prior to the arrival of the next piece of data.

In the preferred embodiment, means are provided for delta modulating or differentiating the data which is stored in matrix 14. More particularly, as indicated, the original data is operated on by the differentiator or difference unit 32 which starting at the top right hand corner subtracts the data in each element of the matrix 14 from the data in the preceding element in a raster scan order. The differences are shown as being read into difference matrix 33. Differences tend to enhance noise, it is therefore advantageous to first substitute a constant into regions where no real data exists. This step is accomplished by circle blanking unit 25, which substitutes a related value into the region outside the circle defined in a DF system by the area of the TV camera. The above differences are scanned for the most common difference value.

In any case where subtraction was performed prior to the compression stage, such as the image subtraction in the embodiment given of a digital fluorographic system and/or delta modulation, the most common value is 0 (zero). So the differences are scanned for zeros by the "0" scan unit 34. In cases where the raw data is compressed the "0" scan unit 34 scans for the most common value which is not necessarily zero, but which will be called "0" for brevity's sake.

This most common value in the data to be compressed (either raw data, image subtracted data, delta modulated data or both subtracted and delta modulated, or even processed in any other manner) may be found on the image prior to compression. However, this is a time consuming operation and it is better to assume, measure or deduce its value beforehand. In fact, the whole distribution histogram (or curve) should be assumed, deduced or measured beforehand if it is wished to perform the compression in real time.

There are methods well known to people versed in this art for creating "efficient" codes, when the distribution of values in the data to be compressed is known. These codes, as explained above, have code values that are generally shorter the more common the value. Thus they utilize the distribution to advantage.

However, in the inventive method a "quasi efficient" replacement code is used: The next to the most numerous data value (difference, in the preferred embodiment) is provided with the shortest code value; the subsequent most numerous difference number is provided with the next shortest code value etc. This may be implemented by way of look-up tables. Thus the non-zero differences are compressed by compressor 38 operating in conjunction with means such as look-up table 39 or dedicated circuit 39, or computer program 39 to compress the data. The compressed data may be written into a matrix arrangement 18. Preferably the compressed data is transferred directly into storage unit 19, where it is retained until needed again.

According to the invention a code value is chosen to indicate "0", the most common value. This code value is not the shortest possible code value but is a unique, non-ambiguous code that is the shortest "effective" code. The most effective code can be determined as follows:

Define the most common difference as d1, the probability of its occurrence as P1, its code length as b1, its "effective" code length when following the disclosed inventive system is: b1*K, where K<1 (Actually, string-length coding is used only if it yields K<1, i.e. it compresses the average strings).

The 2nd and 3rd most common differences are d2, d3; Their probabilities are P2 and P3 respectively, with P2=P3 (assuming a symmetrical probability curve such as a Gaussian, which is a fair assumption considering that the sum of negative differences equals the sum of positive differences, as outside the circle we have a constant value. According to this assumption, of course, d1=0, d2=1 and d3=−1). Their code lengths are b2 and b3 respectively, with b2=b3. The total length TL of the code after compression is:

$$TL = P1*b1*K + 2*P2*b2$$

If the code lengths are switched, the total length becomes TL', where:

$$TL' = P1*b2*K + P2*(b1+b2)$$

and the difference in total lengths is:

$$TL' - TL = (P1*K - P2)*(b2 - b1)$$

The second total length TL' is longer than the first total length TL even where b2<b1 (the code length of the most common difference is greater than the code length of the second most common difference) whenever P1*K<P2. The most "effective" code is thus suprisingly not the one with the shortest code length for the commonest value. The same considerations apply to b4(=b5): b1 should be longer than b4 if P1*K<P4. However, while for DF images P1*K is usually smaller than P2, it is usually not smaller than P4.

The system through the "0" scan unit 34 recognizes and counts "strings" of zeros i.e. sequentially occurring zeros. A replacement code is constructed for the string lengths according to their distribution, which should previously be known, assumed or measured.

This code is "efficient", that is the most common string length is given the shortest possible code value, with the next most common string length having the next shortest code value, etc. This code may also be implemented by a look-up table.

In a preferred embodiment the length of a string with lengths up to 10 is represented by up to six bits. The string lengths 11 to 138 are flagged by a preceding 4 bit code, the string length is then represented by a seven (7) bit code (in a preferred example, the binary code for L-11, where L is the length). All strings are preceded by the code value for "0", which, as explained above is not shorter than other codes although "0" is the commonest value.

Strings longer than 138 are broken into 138-long pieces. Thus, the number 138 is coded and followed by the code that represents the remainder of the string.

In another preferred embodiment, where the areas into which a constant was inserted are wide (and therefore, long strings are more common than medium ones), the string lenth 138 is given a shorter code (say that of 10 in the preceding exemplary embodiment) and lengths of 10–137 are flagged by a 4 bit code and coded in 7 bits.

Note that these are examples only. Other string length codings and other replacement codes for them are also covered by the invention, and can be used if P1*K<P2. Especially the values 10 and 138 may be changed to meet the specific needs. The compression is basically accomplished in compressor 36 using means such as look-up tables 37 or a dedicated circuit 37, or a computer program 37.

Note that although theoretically more optimal codes are possible, such as by unifying the distribution tables of the non-"0" values and the string length, this method has been shown to be equally efficient to the optimal code in several cases and is always at least very close to optimal. The advantage of the inventive method lies in the fact that by always preceding a "0" string by the code value for "0" it is easy to decompress (or expand) the data. The expanding means can check for the code value of "0" and send the data to the appropriate decompressing means, either for non-"0" values or for "0" strings. This enables using either electronic circuits or computer programs doing the expansion in real time, just as the compression can be performed in real time (real time herein means at the same rate as the data is acquired).

The compressed data is retained in storage unit 19 until called up for processing such as for image enhancement by filtering and/or for display.

Figure 4:
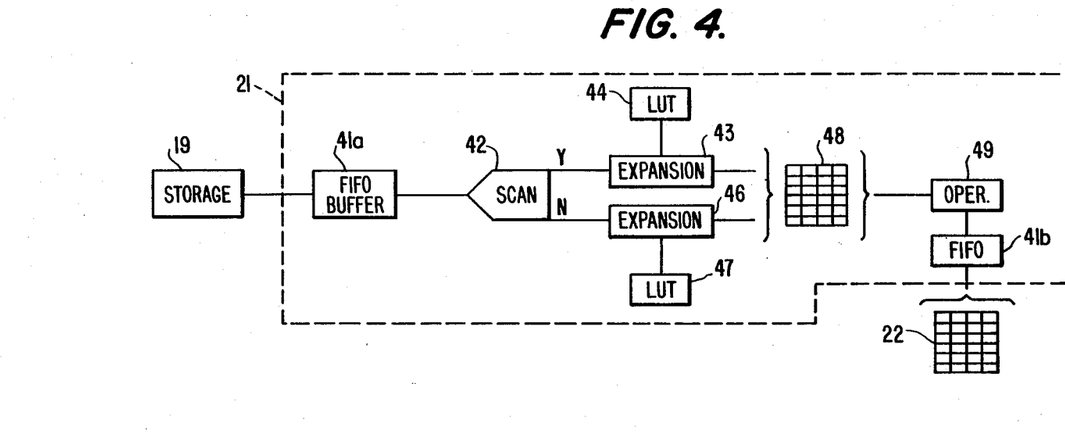

The data is expanded prior to being processed. The details of the expansion system are indicated in FIG. 4. Therein the compressed data is shown as being transferred to a buffer unit 41a which is indicated as being a FIFO unit. The type of the buffer unit is not critical to the invention, though. All that is desired at this point is a means for compensating for the differences in the time required to read the data out of storage means 19 as compared to the time required to write the data into matrix 14.

The data in the buffer 41 is scanned by unit 42 to search for the code value for "0", thus differentiating codes for "0" strings from other data. The zero strings are expanded using the expander 43 and data translator means 44 which translate the "0" string length from the stored codes. Similarly the non "0" data is expanded using the expander unit 46 operating in conjunction with data translator means 47. The means 44 and 47 may be look-up tables, dedicated circuits, or computer programs.

The outputs of expanders 43 and 46 are merged to form the data set 48. The data of set 48 is sigma modulated (added sequentially or integrated) to provide the expanded data of matrix 22 which is the non-compressed data of matrix 14 to be operated on as desired. i.e. after constant value substitution or filtering.

In operation the original data from matrix 14 is sent, in the preferred embodiment, to a buffer. Noise is suppressed at selected regions (such as outside the TV camera defined circle) and optionally elsewhere. The data is differentiated preferably by subtracting the data in adjacent elements in the matrix 14. The difference data is scanned to detect the most common difference (in the exemplary system "0").

A code value is assigned to the above most common difference which is not the shortest code value. In detecting the zeros, strings of zeroes are measured (counted) and coded using an efficient replacement code, with the most prevalent string length having the shortest code value, the next most prevalent string having the next shortest code value and so on. The codes are set into translation means such as look up table 37. Thus zeroes and zero strings are coded, for example as follows:

Zero (0) is indicated by a two bit code: 10. Zero strings are coded as the two bit code 10 followed by the code for the string length.

The string lengths are coded in accordance with the following table:

| length (decimal) | code (1st example) | code (2nd example) |
| --- | --- | --- |
| 1 | 0 | 0 |
| 2 | 010 | 010 |
| 3 | 100 | 100 |
| 4 | 101 | 101 |
| 5 | 1100 | 1100 |
| 6 | 1101 | 1101 |
| 7 | 111000 | 111000 |
| 8 | 111001 | 111001 |
| 9 | 111010 | 111010 |
| 10 | 111011 | 11110000000 |
| 11 | 11110000000 | 11110000001 |
| 12 | 11110000001 | 11110000010 |
| 13 | 11110000010 | 11110000011 |
| 138 | 11111111111 | 111011 |

That is, in the first example any length L up to and including (10) is represented by the code 10 followed by the codes above the dotted line. Any length from 11 to 138 is coded as: the code 10 followed by the code 1111 followed by a seven (7) bit representation which is the binary form of L-11. If the string is longer than 138 the first 138 elements are coded as the bit string: 101111111111; the rest of the string is then coded like a new string.

If the difference data element is not zero then the value is compressed according to the following table:

| value (decimal) | output (bits) |
| --- | --- |
| +1 | 00 |
| −1 | 01 |
| +2 | 1100 |
| −2 | 1101 |
| +3 | 11100 |
| −3 | 11101 |
| +4 | 111100 |
| −4 | 111101 |
| +5 | 1111100 |
| −5 | 1111101 |
| +6 | 11111100 |
| −6 | 11111101 |
| +n | 11111110bbbbbbb |
| −n | 11111111bbbbbbb |

Note that if the absolute decimal value is larger than 6 then the code is the 7 bits of binary representation preceded by a 1111111 and the sign bit. This table assumes the +1, −1 are the second most numerous difference, and that no values exist which are outside the range (−127 − +127).

Note especially that the code for a single zero turns out to be 100, while the code value for a single +1 or a single −1 is shorter (00 or 01 respectively). Still, according to average statistics over a large number of digital fluorography images, the average bits per zero difference is substantially less than 2, and thus the above example codes are more efficient than the so called "efficient" replacement codes.

The same tables are used for the expanders during decoding. The tables create a code with no conflicts. In expansion the bit stream passes through the same look up tables in the reverse direction. The scanner 42 recognizes a zero string and switches to the proper translator means to determine string length.

Note that although modifying the data so as to reduce noise and improve the compression ratio is frowned upon by physicians and therefore not included in this inventive method, the same need not be true for the mask where image subtraction is used. Since the very same mask image is subtracted before compression as is added after expansion the mask never modifies the image values. Therefore, the mask may be any image selected to improve the compression ratio. Thus, it is possible to use a temporally separated image, but it is also possible to use a smoothed such image, the smoothed image itself, an average of several temporarily separated images, a constant average value, an image consising of regional averages and many other possibilities. as previously noted, the image subtraction step is not an integral part of the method although clever selection of a mask and subtraction may significantly improve the compression ratio.

By combining and varying previously disclosed data processing schemes, a new viable efficient data compression system is provided.

While the invention has been described in connection with certain embodiments it must be recognized that this description is by way of example only and not as any limitation on the scope of the invention which is defined by the following claims.

What is claimed is:

1. A data compression method for compressing data to make more efficient use of memory space and to expedite the transfer of said data to and from the memory space; said method comprising the steps of:
   obtaining data to be compressed,
   using a first distribution that is at least similiar to the distribution of the data to be compressed, obtaining first coded values of the data to be compressed using a first code that comprises a quasi-efficient replacement code fitting the said first distribution, obtaining second coded values using a second code applied to specific data of the data to be compressed, using a second distribution that is at least similiar to the distribution of the second coded values, and obtaining third coded values by operating on the said second coded values with a third code comprising an efficient replacement code fitting the said second distribution, whereby the compressed data comprises the third coded values and those first coded values which were not operated on by the second code.

2. The data compression method of claim 1 wherein said second code is a string length code.

3. The data compression method of claim 1 wherein the step of obtaining data includes the steps of:
obtaining data to be compressed,
obtaining difference data from said data to be compressed,
replacing the data to be compressed by the said difference data, and
wherein the first distribution is at least similiar to the distribution of of the difference data.

4. The data compression method of claim 3 wherein the difference data obtaining step comprises delta-modulating said data to be compressed.

5. The data compression method of claim 3 wherein the difference data obtaining step comprises using a difference method on said data to be compressed.

6. The data compression method of claim 1 wherein the data to be compressed comprises difference between a first data set and a reference data set or "mask".

7. The data compression method of claim 6 wherein the said reference data set is a previously acquired data set.

8. The data compression method of claim 6 including the step of creating said mask by processing the data to reduce noise.

9. The data compression method of claim 1 wherein with the quasi-effecient replacemet code the most prevelant data to be compressed is represented by a coded value other than the shortest coded value, wherein the second most prevelant data value to be compressed is represented by the shortest coded value with sequentially next most prevelant values being represented by the shortest coded value not previously used.

10. The data compression method of claim 1 wherein the second code comprises the step of scanning the data to find strings of a specific value, determining the lengths of said strings and replacing said strings by a combination of said string lengths and said specific values.

11. The data compression method of claim 10 wherein the said specific value is the most prevelant value.

12. The data compression method of claim 11 wherein the third code is an efficient replacement code of the string lengths.

13. The data compression method of claim 1 including the step of suppressing noise in no data regions of the data to be compressed.

14. The data compression method of claim 13 including the step of obtaining differences of the data to be compressed after the said suppressing of the noise.

15. The data compression method of claim 14 wherein said difference obtaining step comprises delta modulating said data to be compressed.

16. The data compressed method of claim 13 wherein the data to be compressed is digitized and stored in matrix elements and wherein the step of suppressing noise includes assigning data values to the no data elements of said matrix.

17. The data compression method of claim 1 including the step of using look-up tables to obtain coded values.

18. The data compression method claim 1 including the step of programming said codes to obtain coded values.

19. The data compression method of claim 1 including the step of using dedicated circuitry to supply said coded values.

20. A data compression method for compressing image data to more efficiently use memory space and to expedite the transfer of said data to and from said memory space, said method comprising the steps of:
obtaining image data to be compressed,
using a first distribution of the data being compressed that is at least similiar to the distribution of the image data being compressed
compressing the image data with a first code arrangement comprising a quasi-efficient replacement code fitting said first distribution to obtain first coded values,
compressing the first coded values with a second coded arrangement selectively applied to specific values of said first coded values to obtain second coded values, and
compressing the second coded values with a third code arrangement comprising an efficient replacement code fitting a second distribution that is at least similiar to the distribution of said second coded values to obtain third coded values.

21. The compression method of claim 20 wherein said second code comprises a string length code.

22. The compression method of claim 21 wherein the step of obtaining differences of said data to be compressed comprises delta-modulating said data to be compressed.

23. The compression method of claim 22 including the steps of:
obtaining a mask image
operating on said mask image to suppress noise,
subtracting said mask image from said data to be compressed to obtain new data,
obtaining differences of said new data to obtain new difference data, and
applying said first code to said new difference data.

24. The data compression method of claim 23 wherein said mask comprises temporally separated images.

25. The data compression method of claim 22 wherein said string length code is applied to a given value only.

26. The data compression method of claim 25 wherein said given value is the most prevelant value of said difference data.

27. A data compression system for compressing data to make more efficient use of memory space and to expedite the transfer of said data to and from the memory space; said system comprising:
  means for obtaining data to be compressed,
  means for obtaining first coded values of the data to be compressed using a first code that comprises a quasi-efficient replacement code fitting a first distribution that is at least similar to the distribution of the data to be compressed,
  means for obtaining second coded values using a second code applied to specific data of the data to be compressed, and
  means for obtaining third coded values by operating on the said second coded values with a third code comprising an efficient replacement code fitting a second distribution that is at least similar to the distribution of the second coded values, whereby the compressed data comprises the third coded values and those first coded values which were not operated on by the second code.

28. The data compression system of claim 27 wherein said second code is a string length code.

29. The data compression system of claim 28 including means for obtaining differences of the data to be compressed subsequent to the operation of the means for suppressing of noise.

30. The data compression system of claim 29 wherein said difference obtaining means comprises means for delta modulating said data to be compressed.

31. The data compression system of claim 27 wherein said means for obtaining data to be compressed comprises:
  means for obtaining data to be comprised,
  means for obtaining difference data from said date to be compressed,
  means for replacing the data to be compressed by said difference data and,
  wherein said first distribution is at least similiar to the distribution of the said difference data.

32. The data compression system of claim 31 wherein the difference data obtaining means comprises means for delta-modulating said data to be compressed.

33. The data compression system of claim 31 wherein the difference data obtaining means comprises means using a difference method on said data to be compressed.

34. The data compression system of claim 27 wherein the data to be compressed comprises differences between a first data set and a reference data set or "mask".

35. The data compression system of claim 34 wherein the said reference data set is a previously acquired data set.

36. The data compression system of claim 34 including means for creating said mask by processing the data to reduce noise.

37. The data compression system of claim 27 wherein with the quasi-effecient replacement code the most prevelant data to be compressed is represented by a coded value other than the shortest coded value, wherein the second most prevelant data value to be compressed is represented by the shortest coded value with sequentially next most prevalent values being represented by the shortest coded value not previously used.

38. The data compression system of claim 27 wherein the means for obtaining the second coded values comprises means for scanning the data to determine strings of a specific value and the lengths of the strings, and means for replacing said strings with a combination of said specific value and said string lengths.

39. The data compression system of claim 38 wherein the said specific value is the most prevalent value.

40. The data compression system of claim 39 wherein the third code is an efficient replacement code of the string lengths.

41. The data compression system of claim 27 including means for suppressing noise in no data regions of the data to be compressed.

42. The data compression system of claim 44, including means for digitizing the data to be compressed, means for storing said digitized data in matrix elements, and wherein the means for suppressing noise includes means for assigning data values to the no data elements of said matrix.

43. The data compression system of claim 27 including look-up tables to obtain coded values.

44. The data compression system of claim 27 including means for programming said codes to obtain coded values.

45. The data compression system of claim 27 including dedicated circuitry to supply said coded values.

46. A data compression system for compressing image data to more efficiently use memory space and to expedite the transfer of said data to and from said memory space, said system comprising:
  means for obtaining image data to be compressed,
  means for obtaining differences of said image data to be compressed
  means for compressing the image data with a first code arrangement to obtain first coded values using a first distribution that is at least similiar to the distribution of said image data being compressed, said first code arrangement comprising a quasi-efficient replacement code,
  means for compressing the first coded values with a second code arrangement selectively applied to specific values of said first coded values to obtain said second values, and
  means for compressing the second coded values with a third code arrangement comprising an efficient replacement code using a second distribution that is at least similiar to said distribution of said second coded values to obtain third coded values.

47. The compression system of claim 46 wherein said second code comprises a string length code.

48. The compression system of claim 47 wherein said means for obtaining differences of said data to be compressed, comprises delta-modulating means.

49. The compression system of claim 47 including:
  means for obtaining a mask image,
  means for operating on said mask image to suppress noise,
  means for subtracting said mask image from said data to be pressed to obtain new data
  means for obtaining differences of said new data to obtain new difference data, and
  means for applying said first code to said new difference data.

50. The data compression system of claim 49 wherein said mask comprises temporally separated images.

51. The data compression system of claim 47 wherein said string length code is applied to a given value only.

52. The data compression system of claim 51 wherein said given value is the most prevalent of said difference data.

* * * * *